United States Patent
Fukuda

(10) Patent No.: US 9,124,726 B2
(45) Date of Patent: Sep. 1, 2015

(54) IMAGE PROCESSING APPARATUS AND IMAGE PROCESSING METHOD

(71) Applicant: Sony Corporation, Tokyo (JP)

(72) Inventor: Hidenori Fukuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 198 days.

(21) Appl. No.: 13/788,788

(22) Filed: Mar. 7, 2013

(65) Prior Publication Data

US 2013/0258192 A1    Oct. 3, 2013

(30) Foreign Application Priority Data

Mar. 29, 2012    (JP) .................................. 2012-076546

(51) Int. Cl.
| | |
|---|---|
| H04N 7/173 | (2011.01) |
| H04N 5/70 | (2006.01) |
| H04N 7/00 | (2011.01) |
| H04N 21/236 | (2011.01) |
| H04N 21/2368 | (2011.01) |
| H04N 21/433 | (2011.01) |
| H04N 5/913 | (2006.01) |

(52) U.S. Cl.
CPC ................. *H04N 7/00* (2013.01); *H04N 5/913* (2013.01); *H04N 21/2368* (2013.01); *H04N 21/23611* (2013.01); *H04N 21/4331* (2013.01)

(58) Field of Classification Search
CPC ....................................................... H04N 7/173
USPC ............................................... 725/87, 91–93
See application file for complete search history.

(56) References Cited

U.S. PATENT DOCUMENTS

| | | | | |
|---|---|---|---|---|
| 6,397,253 | B1 * | 5/2002 | Quinlan et al. | 709/227 |
| 2006/0245726 | A1 * | 11/2006 | Mizuno | 386/95 |
| 2011/0025981 | A1 * | 2/2011 | Redmann et al. | 352/40 |

FOREIGN PATENT DOCUMENTS

JP    2010-231611    10/2010

* cited by examiner

*Primary Examiner* — Kieu Oanh T Bui
(74) *Attorney, Agent, or Firm* — Oblon, McClelland, Maier & Neustadt, L.L.P.

(57) ABSTRACT

A video system, comprising includes a video reproduction device that retrieves a predetermined subset of video and audio data from a server. The video reproduction device then starts reproduction of the video and audio data based on the predetermined subset of video and audio data. The predetermined subset of video and audio data includes sufficient data to cause the video reproduction device to determine that all of the video and audio data has been received and that reproduction can be started.

18 Claims, 15 Drawing Sheets

IMAGE PROCESSING APPARATUS AND IMAGE PROCESSING METHOD

CROSS-REFERENCE TO RELATED APPLICATIONS

This application claims the benefit of priority under 35 U.S.C. §119 of Japanese Patent Application No. 2012-076546 filed Mar. 29, 2012, the entire contents of which are incorporated herein by reference.

BACKGROUND

The present disclosure relates to an image processing apparatus which performs image processing and an image processing method.

In movie-related environments, along with the progress of digital technology, for example, films are being changed to digital signals and movies are being produced using video equipment and being exhibited at theaters using projectors or the like. In order to realize such digital cinema, data compression techniques, encryption techniques for copyright protection, and the like are being used.

In addition, a movie using the digital cinema is exhibited at a theater with a method in which a movie distributor generates a predetermined format of data and provides the data to each theater and the provided data is reproduced by a reproduction device in each theater.

As the data format provided from a movie distributor to each movie theater, a format called Digital Cinema Package (DCP) is being widely used. The DCP is a data format defined by the specification proposed by an industry standards organization, Digital Cinema Initiatives (DCI).

In the related art of digital cinema systems, Japanese Unexamined Patent Application Publication No. 2010-231611 discloses a technique in which an urgent level is determined on an item, which does not satisfy exhibition requirements, among confirmation items set in advance for exhibition; and the properties of a reproduction on a management window are switched in accordance with the urgent level.

In digital cinema systems, a reproduction device having a local storage is arranged for each auditorium (screen). The reproduction device receives movie content distributed from a higher-level server through the network, stores the movie content in the local storage, and reproduces the movie content stored in the local storage.

In this case, with digital cinema systems of the related art, it is difficult for a reproduction device to start the exhibition of movie content until all the data of the movie content is stored in a local storage.

Since the size of movie content is usually of the order of several hundreds of GB, a long time, for example, at least an hour or longer is taken to download all the data of movie content onto a local storage of a reproduction device through the network.

On the other hand, in theaters, such as cinema complex, where plural auditoriums are arranged in the same facility, there may be a request to change an auditorium during an intermission. In this case, it is necessary that a reproduction device provided in another auditorium newly acquire data of movie content.

However, as described above, in the related art, it is difficult to reproduce a movie until all the data of the movie content is stored in a local storage. Therefore, it is difficult to adopt a manner in which, for example, an auditorium is changed abruptly and a reproducing device of another auditorium acquires data of movie content during an intermission of about several tens of minutes to reproduce the movie on time.

As described above, in the related art, it is difficult to change an auditorium in a short period of time and reproduce a movie, which is inconvenient for creating an exhibition schedule.

SUMMARY

It is desirable to provide an image processing apparatus and an image processing method capable of reducing a time from the acquisition of movie content to the start of reproduction.

According to an embodiment of the present disclosure, there is provided an image processing apparatus including an image acquisition unit and an image reproduction unit. The image acquisition unit acquires image content distributed through the network. The image reproduction unit stores the acquired image content in a storage and reads the image content from the storage for reproduction.

When the image reproduction unit reproduces the image content and the completion of ingestion of the image content is set as a requirement, the image acquisition unit performs a prefetch process of acquiring a predetermined part of the data, which is included in the image content when the image content is distributed, and registering the data in the image reproduction unit, so as to cause the image reproduction unit to determine in a pseudo manner that the requirement is satisfied and recognize that the image content is reproducible.

Specifically, a video system according to an exemplary embodiment includes a video reproduction device to receive, from a server, a predetermined subset of video and audio data and to start reproduction of the video and audio data based on the predetermined subset of video and audio data, where the predetermined subset of video and audio data is sufficient to cause the video reproduction device to determine that all of the video and audio data has been received.

According to another embodiment, a video reproduction method includes receiving, from a server, a predetermined subset of video and audio data at a video reproduction device, and starting reproduction of the video and audio data based on the predetermined subset of video and audio data, where the subset of video and audio data is sufficient to cause the video reproduction device to determine that all of the video and audio data has been received.

In a further exemplary embodiment, a non-transitory computer-readable medium is encoded with computer-readable instructions that when executed by a computer cause the computer to perform a video reproduction method. The video reproduction method includes receiving a predetermined subset of video and audio data, and starting reproduction of the video and audio data based on the predetermined subset of video and audio data, where the subset of video and audio data is sufficient to cause a determination that all of the video and audio data has been received.

According to the exemplary embodiments described herein, a time from the acquisition of movie content to the start of reproduction can be reduced.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings. However, the accompanying drawings and their exemplary depictions do not in any way limit the scope of the disclosure embraced by the specification. The scope of the disclosure embraced by the specification and drawings is defined by the claims.

DETAILED DESCRIPTION OF EMBODIMENTS

Figure 1:
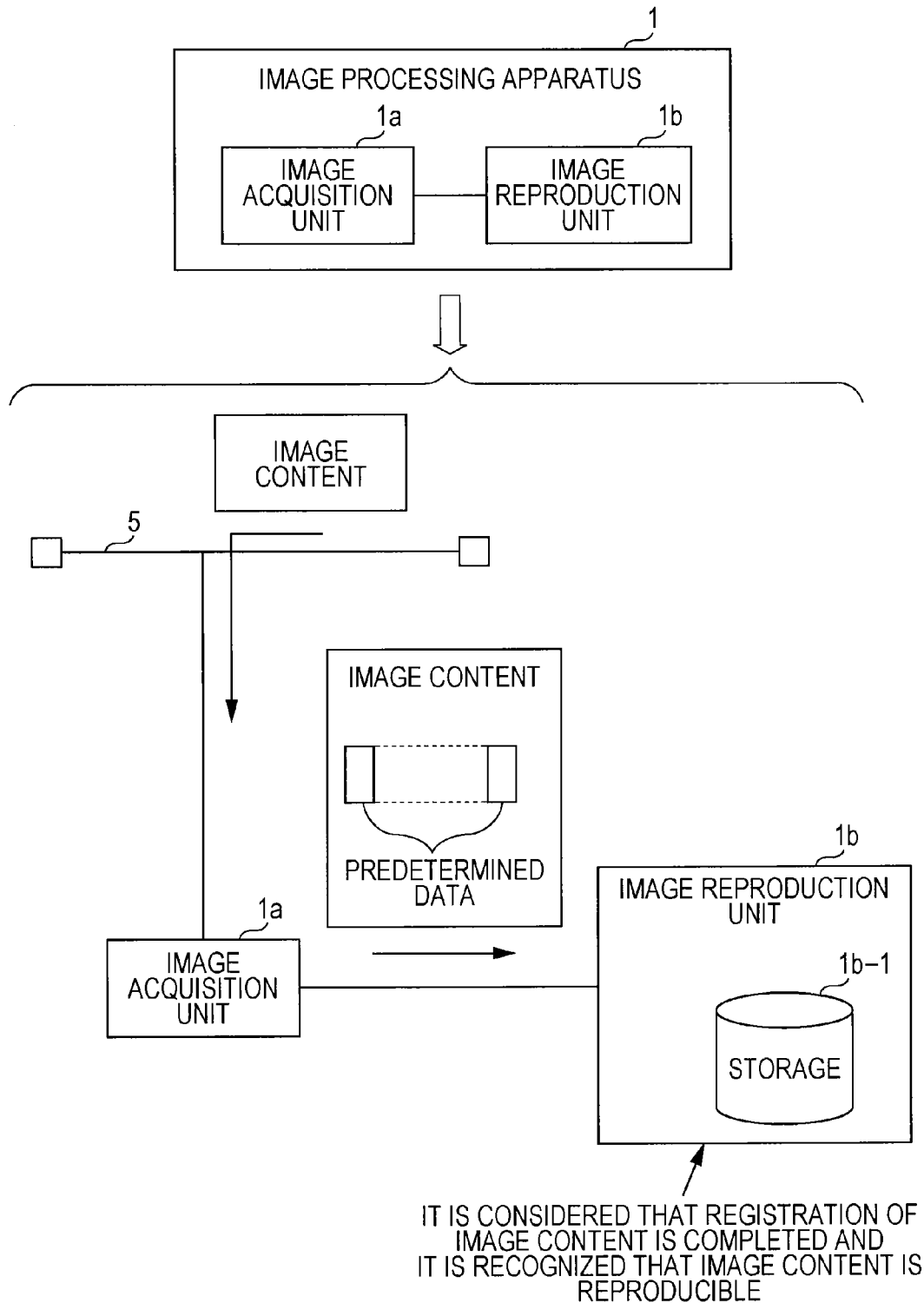
FIG. 1 is a diagram illustrating a configuration example of an image processing apparatus.

Hereinafter, embodiments will be described with reference to the drawings. FIG. 1 is a diagram illustrating a configuration example of an image processing apparatus. An image processing apparatus 1 includes an image acquisition unit 1a and an image reproduction unit 1b. The image acquisition unit 1a acquires image content distributed through a network 5.

The image reproduction unit 1b includes a storage 1b-1, stores the acquired image content in the storage 1b-1, and reads the image content from the storage 1b-1 for reproduction.

when the image reproduction unit 1b reproduces the image content and the completion of ingestion of the image content is set as a requirement, the image acquisition unit 1a performs a prefetch process of acquiring a predetermined part of the data, which is included in the image content when the image content is distributed, and registering the data in the image reproduction unit 1b. The ingestion described herein represents all the necessary data for exhibition of movie content being acquired.

As a result, the image acquisition unit 1a causes the image reproduction unit 1 to determine that the requirement is satisfied and recognize that the image content is reproducible. As described above, in the image processing apparatus 1a, when image content is distributed, the image acquisition unit 1a initially acquires a predetermined part of the data included in the image content.

When the predetermined data is stored in the storage 1b-1, the image reproduction unit 1b considers that necessary data for exhibition of movie content is registered and recognizes the movie content is reproducible.

Next, an example in which the image processing apparatus 1 is applied to a digital cinema system will be described. The image content described herein corresponds to movie content and will be sometimes referred to as a Digital Cinema Package (DCP) in the following description.

The DCP is a data format of movie contents proposed by the above-described Digital Cinema Initiative (DCI) and includes various data files necessary for exhibition of digital cinema.

Figure 2:
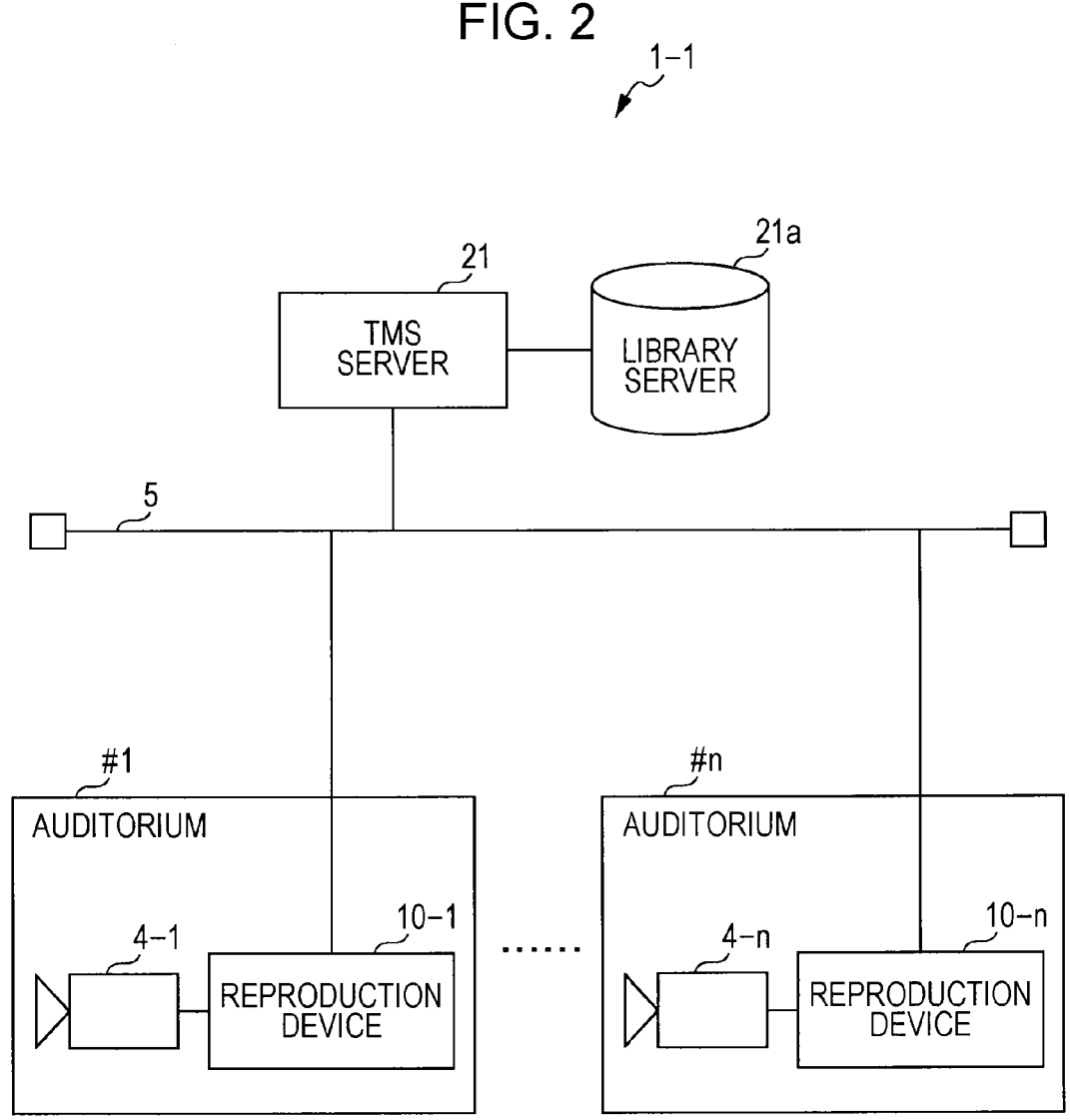
FIG. 2 is a diagram illustrating a configuration example of a digital cinema system.

FIG. 2 is a diagram illustrating a configuration example of a digital cinema system. A digital cinema system 1-1 includes a Theater Management System (TMS) server 21, a library server 21a, and reproduction devices 10-1 to 10-n.

The reproduction devices 10-1 to 10-n are respectively arranged in auditoriums #1 to #n. In addition, the reproduction devices 10-1 to 10-n are respectively connected to projectors 4-1 to 4-n. Furthermore, the reproduction devices 10-1 to 10-n and the TMS server 21 are connected to each other through the network 5.

The TMS server 21 is a higher-level server that reads data of DCPs for exhibition, which will be reproduced by the reproduction devices 10-1 to 10-n, from the library server 21a and distributes the data through the network 5.

The library server 21a is a mass storage library which stores data of DCPs and the like. In general, in the library server 21, Redundant Arrays of Inexpensive Disks (RAID) are configured.

The reproduction devices 10-1 to 10-n receive DCPs distributed from the TMS server 21 through the network 5 and stores the DCPs in a local storage (not illustrated). Then, the reproduction devices 10-1 to 10-n read the stored DCPs from the local storage for reproduction (exhibition).

Figure 3:
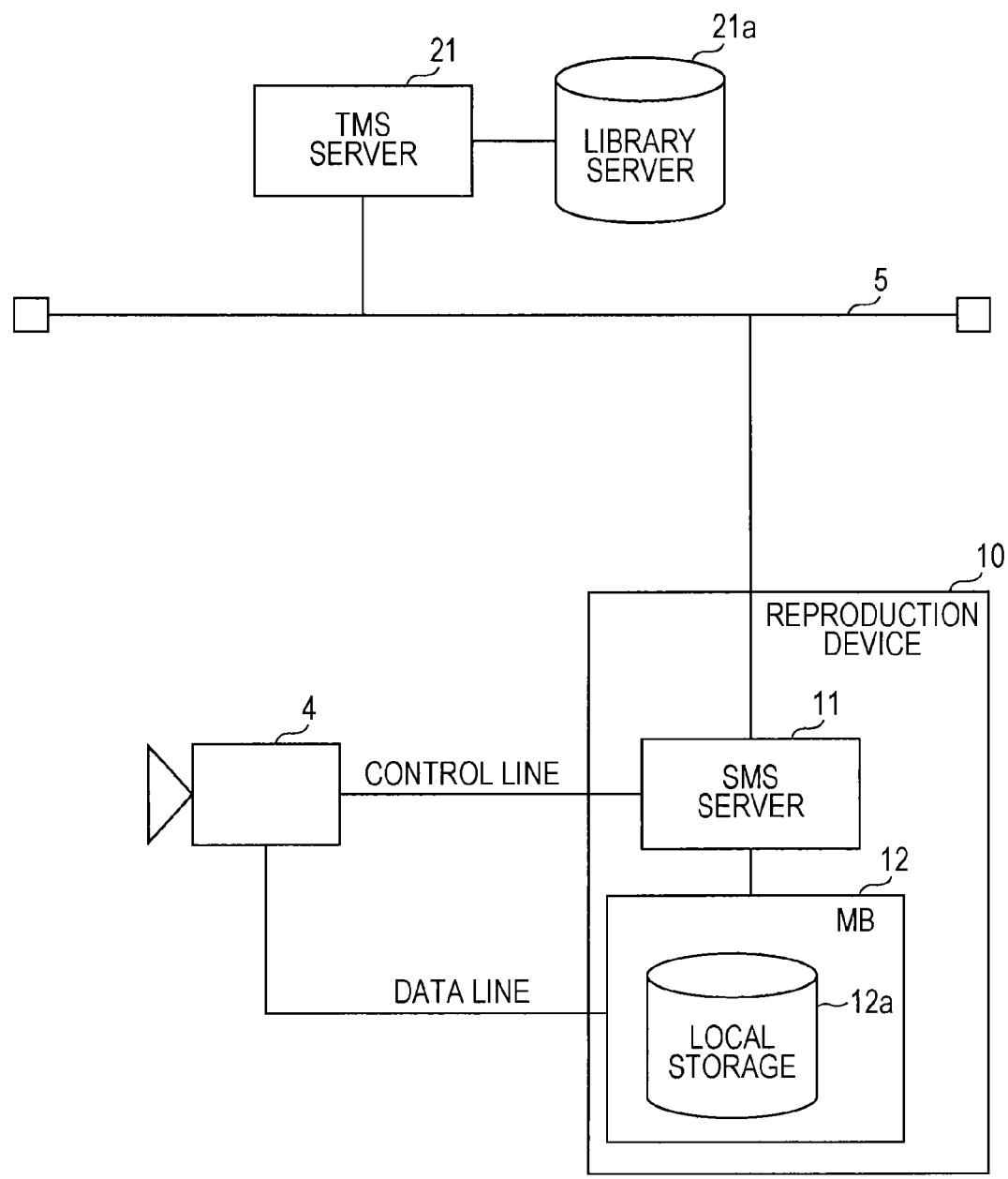
FIG. 3 is a diagram illustrating a configuration example of a reproduction device.

FIG. 3 is a diagram illustrating a configuration example of a reproduction device. A reproduction device 10 includes a Screen Management System (SMS) server 11 and a Media Block (MB) 12. The MB 12 includes a local storage 12a. In addition, a projector 4 is connected to the reproduction device 10.

In the drawing, the MB 12 includes the storage 12a, but the local storage 12 may be provided outside the MB 12 and be connected to the MB 12. In this case, the SMS server 11 has a function of the image acquisition unit 1a of FIG. 1, and the MB 12 has a function of the image reproduction unit 1b of FIG. 1. In addition, the local storage 12a corresponds to the storage 1b-1 of FIG. 1.

The SMS server 11 performs controls of prefetching a DCP transferred through the network 5 and of managing the overall operation of the reproduction device 10. Regarding the operation of the SMS server 11, for example, the SMS server 11 acquires a DCP distributed through the network 5 from the TMS server 21 and instructs the MB 12 to exhibit the acquired DCP.

Furthermore, the SMS server 11 manages operations of devices such as turn-on, turn-off, or stand-by of the projector 4 and the MB 12 in an integrated manner without operating each device separately. In the SMS server 11, a Projectionist Terminal (PJT; not illustrated) which provides the operator with Graphical User Interface (GUI) is installed.

The MB 12 performs a process of writing a DCP onto the local storage 12a (transfer system) and a process of reading the stored DCP from the local storage 12a for reproduction (exhibition system). Regarding the reproduction process, for example, the MB 12 decodes an encrypted DCP such that the reproduction device 10 causes a target projector to reproduce a movie.

In addition, the MB 12 generates a subtitle based on Extensible Markup Language (XML) or Portable Network Graphics (PNG) format subtitle data, which is included in a DCP, and overlays the subtitle.

Furthermore, the MB 12 converts Waveform (WAV) format audio data, which is included in a DCP, into Audio Engineering Society/European Broadcasting Union (AES/EBU) format digital audio data and outputs the converted audio data. In addition, the MB 12 performs delay setting for lip-syncing the audio data with the video data.

Furthermore, the MB 12 automatically recognizes the image size of a DCP and reproduces images corresponding to various resolutions of 4K and 2K. 4K described herein refers to an image display format of high resolution of 4096×2160 pixels and 2K described herein refers to an image display format of high resolution of 2048×1080 pixels.

On the other hand, the local storage 12a stores data of DCPs. In the local storage 12a, RAID can be configured. The projector 4 is connected to the SMS server 11 through a control line and is connected to the MB 12 through a data line.

The projector 4 receives video data transferred from the MB 12 through the data line, receives a control command (command which instructs the projector 4 to operate) transmitted from the SMS server 11 through the control line, and projects video data onto a screen based on the control command.

In the above description, the SMS server 11 outputs a control command and the MB 12 outputs video data. However, the MB 12 can output both of a control command and video data to the projector 4.

Figure 4:
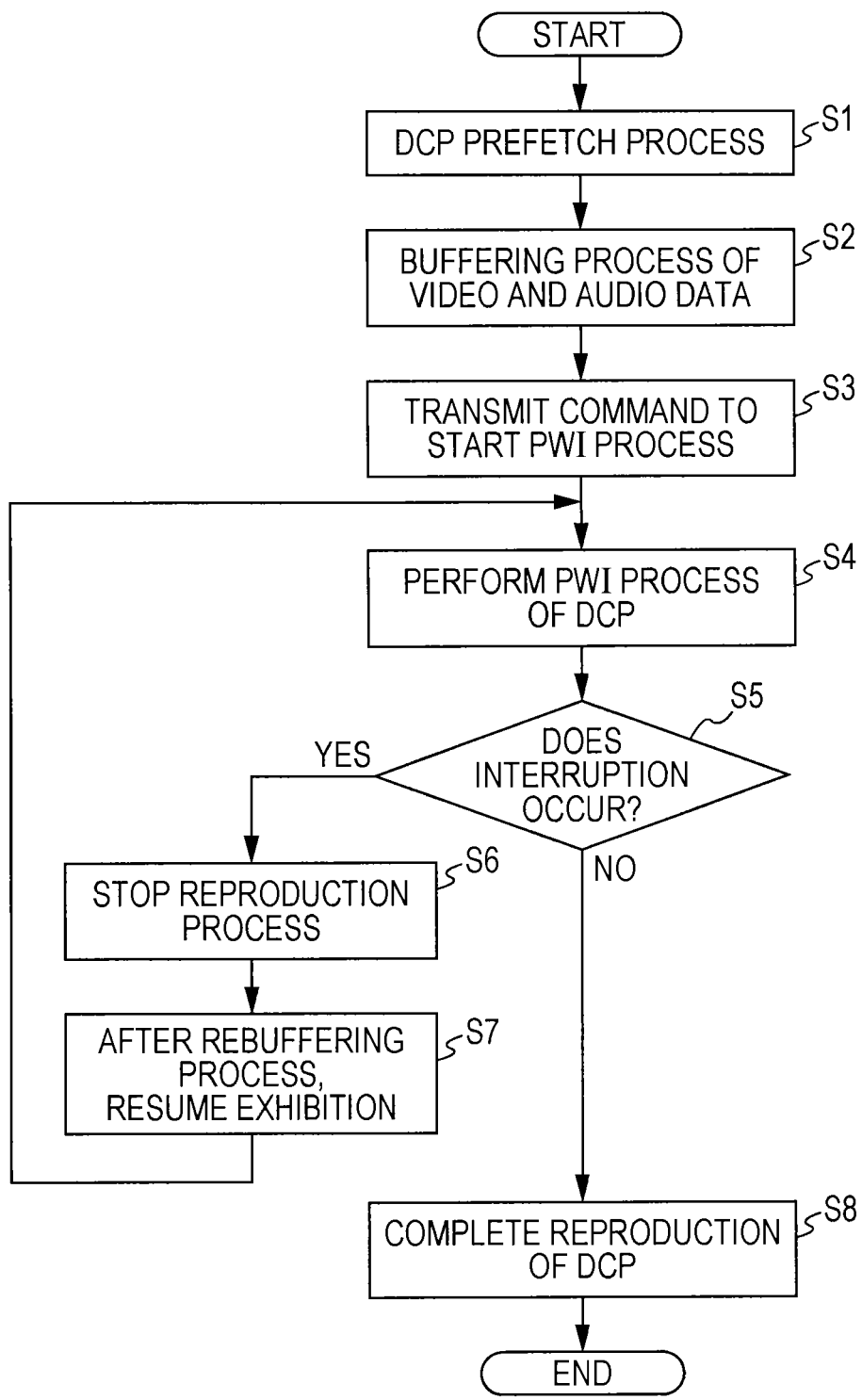
FIG. 4 is a flowchart illustrating the operation of image processing.

Next, the overall flows of the image processing according to the present disclosure will be described. FIG. 4 is a flowchart illustrating the operation of image processing.

[S1] The SMS server 11 performs a DCP prefetch process (DCP part acquisition process) which acquires a part of data of a DCP in advance.

[S2] The MB 12 stores a given amount of data from video data and audio data, respectively, in advance before the start of an exhibition. Hereinafter, the previous acquisition of a given amount of data from all the video and audio data will be referred to as the buffering process.

[S3] The SMS server 11 transmits a command for performing a Play-While-Ingest (PWI) process to the MB 12.

[S4] The MB 12 performs the PWI process of the DCP.

[S5] The MB 12 determines whether the exhibition of the DCP is interrupted (for example, buffer underrun (described below)) halfway or not. When the exhibition is interrupted, the process proceeds to step S6, and when the exhibition is not interrupted, the process proceeds to step S8.

[S6] The MB 12 detects the interruption and stops the reproduction process.

[S7] The MB 12 resumes the exhibition after a rebuffering process. The process proceeds to step S4.

[S8] The reproduction of the DCP stored in the local storage 12a is completed.

Figure 5:
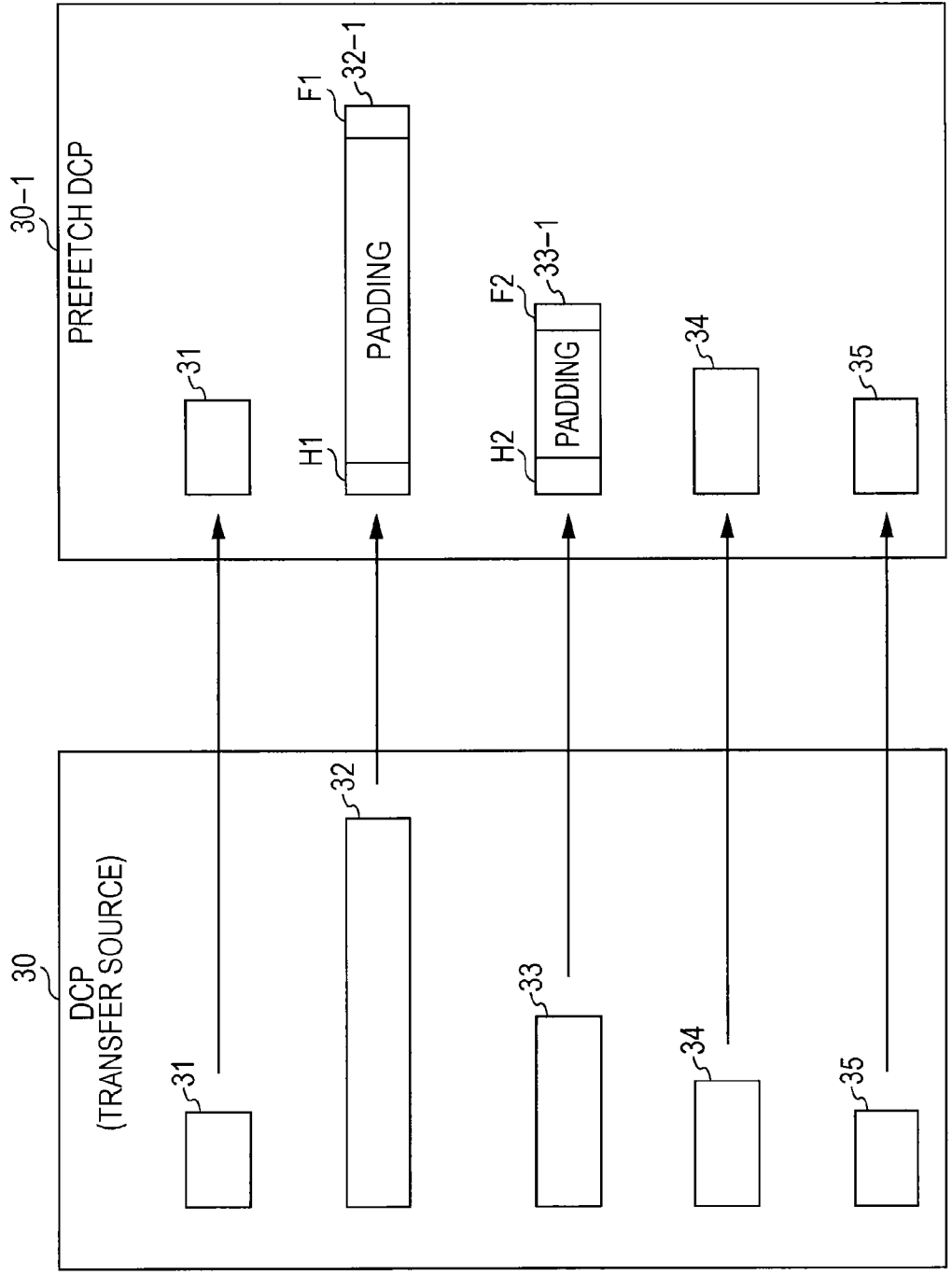
FIG. 5 is a diagram illustrating a DCP prefetch process.

Next, the above-described operation of each step will be described in detail. First, the DCP prefetch process of step S1 will be described. FIG. 5 is a diagram illustrating the DCP prefetch process. In the following description, it is assumed that a DCP 30 is transferred through the network 5 and the reproduction device 10 reproduces the DCP 30.

The DCP 30 which is a transfer source includes data files of a packing list 31, video data 32, audio data 33, a subtitle 34, and a closed caption 35.

The packing list 31 is a specification of a package unit of the DCP 30 and is list information indicating which files are included in the DCP 30. The packing list 31 is usually formed of XML format data.

The video data 32 is data containing image components of movie content. The audio data 33 is data containing audio components of the movie content.

The subtitle 34 is data containing information pertaining to subtitle characters and layout information of the movie.

The closed caption 35 is subtitle data which can switch between the display and the non-display of the subtitle. A content of audio information, which is being used in an image, is displayed as character information for, for example, people with hearing difficulties.

In the DCP prefetch process, when being instructed to prepare the PWI process of the DCP 30, the SMS server 11 initially acquires only predetermined data necessary for the registration of the DCP.

The predetermined data necessary for the registration of the DCP includes at least one of the packing list 31; a header portion H1 which is the beginning of the video data 32 and a footer portion F1 which is the end of the video data 32; and a header portion H2 which is the beginning of the audio data 33 and a footer portion F2 which is the end of the audio data 33.

Therefore, the SMS server 11 acquires in advance (prefetches), from the DCP 30, the packing list 31; the header portion H1 and the footer portion F1 of the video data 32; and the header portion H2 and the footer portion F2 of the audio data 33.

The subtitle 34 and the closed caption 35 have a relatively small data size. Therefore, in the example of FIG. 5, the SMS server 11 also prefetches the subtitle 34 and the closed caption 35.

When the header portion H1 and the footer portion F1 of the video data 32 are acquired, the SMS server 11 pads dummy data into a region between the header portion H1 and the footer portion F1 (originally, a region where there is actual video data) to generate video data 32-1. The padding is performed by inserting dummy data having continuous "0"s.

Likewise, When the header portion H2 and the footer portion F2 of the audio data 33 are acquired, the SMS server 11 pads dummy data into a region between the header portion H2 and the footer portion F2 (originally, a region where there is actual audio data) to generate audio data 33-1.

Hereinafter, a DCP including a group of files prefetched by the SMS server 11 will be referred to as the prefetch DCP. In the stage of FIG. 5, the prefetch DCP 30-1 includes the packing list 31, the video data 32-1, the audio data 33-1, the subtitle 34, and the closed caption 35.

Figure 6:
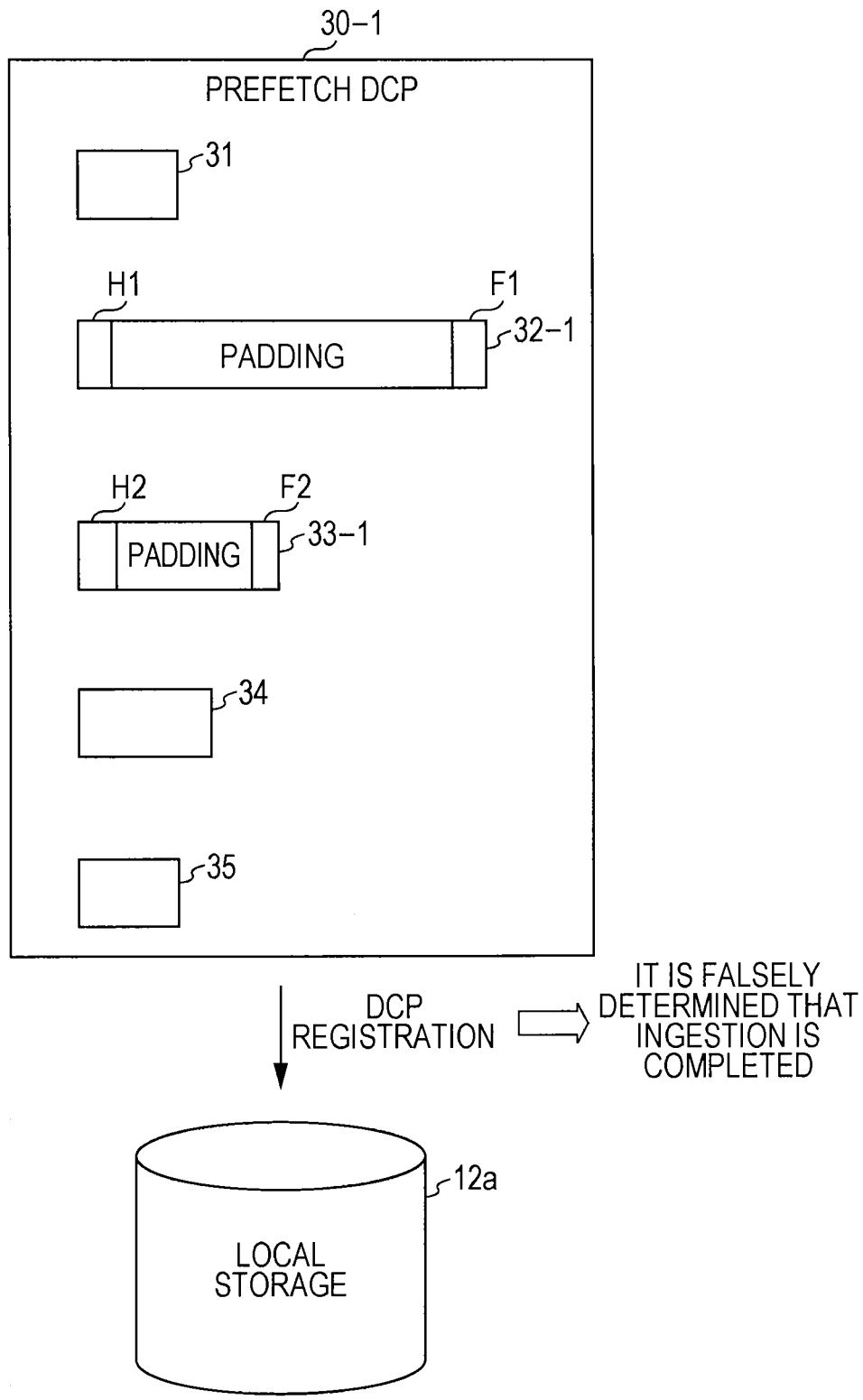
FIG. 6 is a diagram illustrating the registration of a DCP.

FIG. 6 is a diagram illustrating the registration of a DCP. The MB 12 stores the prefetch DCP 30-1, acquired by the SMS server 11, in the local storage 12a.

In this case, when the movie of the DCP 30 is reproduced, the MB 12 checks whether the DCP 30 is registered or not. When it is recognized that the DCP is registered, the MB 12 determines that all the information of the DCP 30 for reproduction are stored in the local storage 12a and considers that the ingestion of the DCP 30 is completed.

The ingestion represents the local storage 12 acquiring all the information of a DCP for reproduction. In this way, when it is recognized that the DCP is registered, the MB 12 determines that the exhibition can start.

Therefore, when the DCP 30 is distributed, the SMS server 11 prefetches only necessary information for the registration of the DCP and stores the prefetch DCP 30-1 in the local storage 12a.

By performing such a DCP prefetch process, the MB 12, which performs the reproduction process as described above, can recognize as if all the data of the DCP were stored in the local storage 12a.

Although actual video data and audio data are not stored in the local storage 12a, the stored DCP registration information causes the MB 12 to determine in a pseudo manner that the ingestion of information of a DCP for reproduction is completed and to recognize that the exhibition can start.

Figure 7:
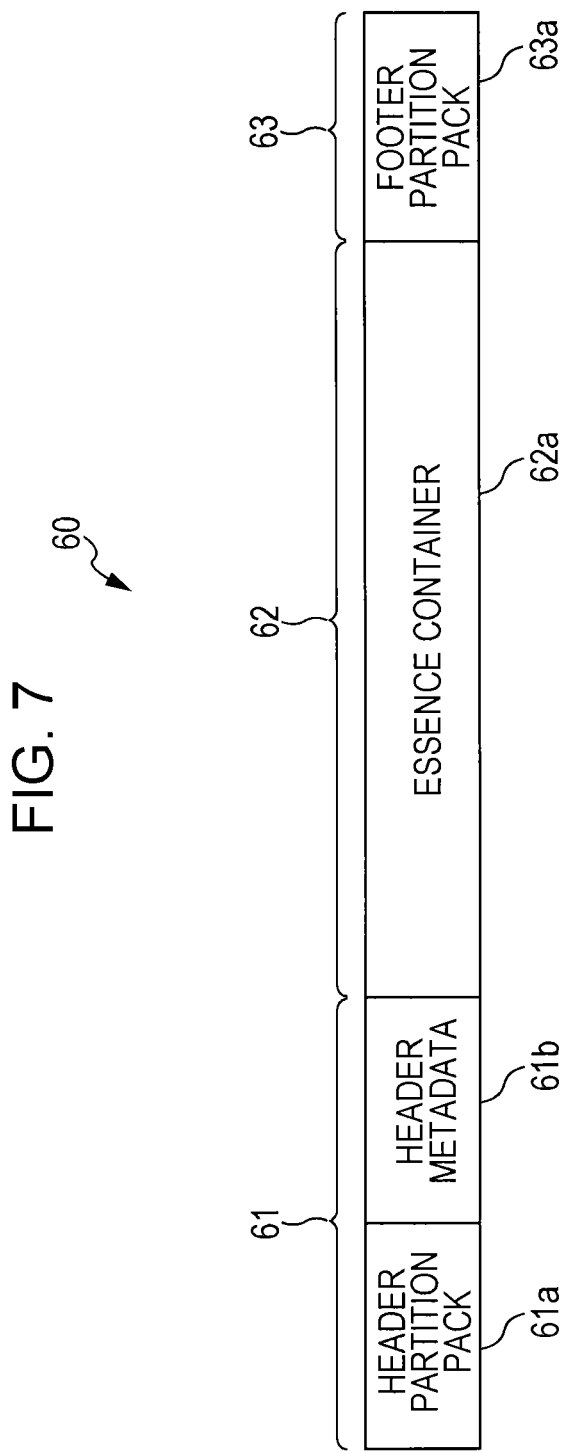
FIG. 7 is a diagram illustrating a format configuration of video and audio data.

Next, a format configuration of video and audio data will be described. FIG. 7 is a diagram illustrating a format configuration of video and audio data. Both of the video data and the audio data included in the DCP 30 are configured by a file format called Material Exchange Format (MXF) as illustrated in FIG. 7. In the description of FIG. 7, the video data and the audio data are collectively referred to as the video and audio data 60.

The video and audio data 60 includes a file header 61, a file body 62, and a file footer 63.

The file header 61 is a header portion of the video and audio data 60 and includes fields of a header partition pack 61a and header metadata 61b.

The file body 62 includes a field of an essence container 62a. The file footer 63 is a footer portion of the video and audio data 60 and includes a field of a footer partition pack 63a.

The header partition pack 61a and the footer partition pack 63a are fields into which configuration information of all the files is inserted. In addition, the header metadata 61b is data indicating which movie data is inserted into the file body 62 (for example, data containing a frame rate, a title, and the like). Into the essence container 62a, actual data of movie content is inserted.

The above-described file header 61 and the file footer 63 of the video and audio data 60 are used as the DCP registration information and are stored in the local storage 12a before the start of the exhibition (when the DCP is registered, dummy data is inserted into the file body 62).

Figure 8:
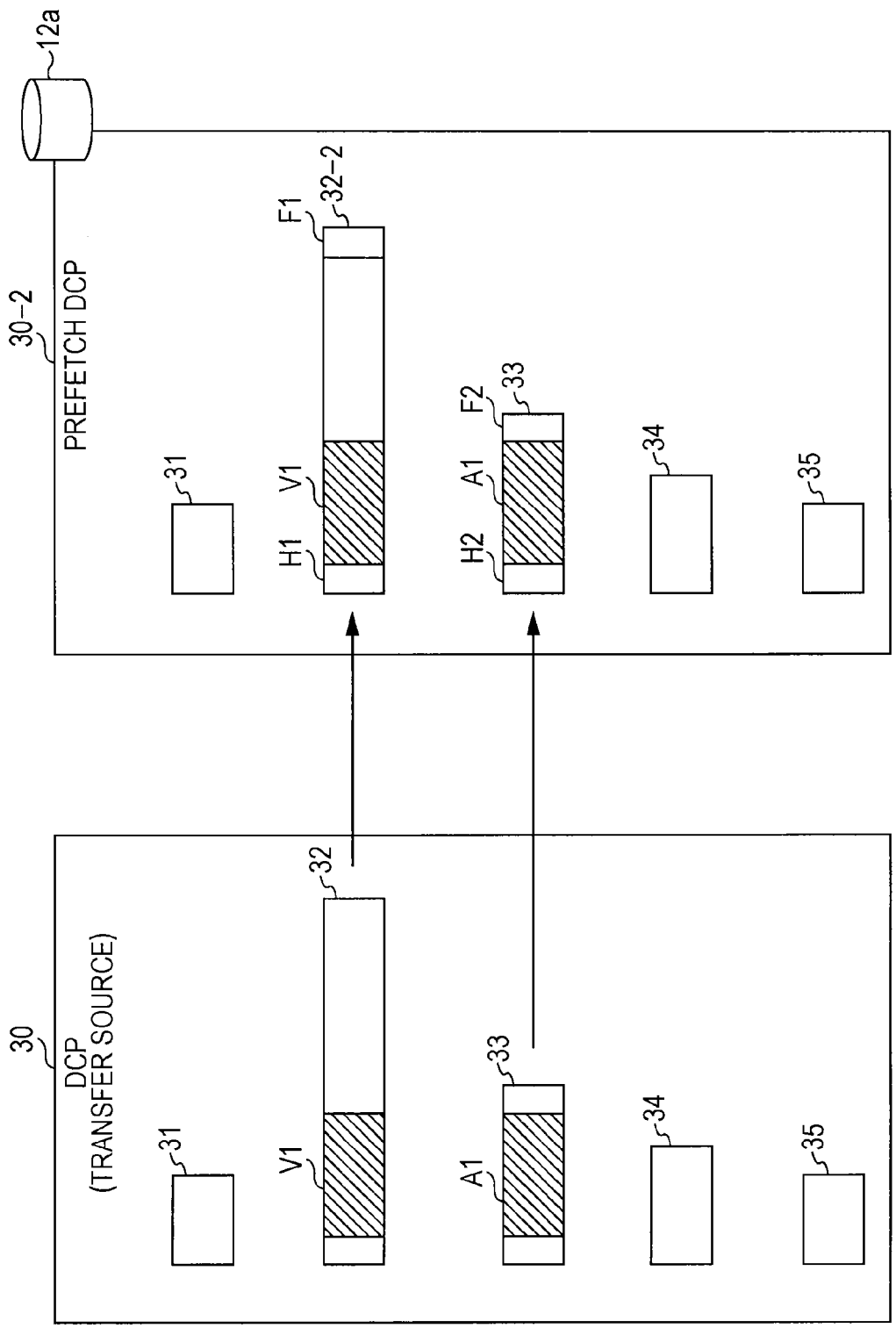
FIG. 8 is a diagram illustrating a buffering process.

Next, the buffering process of step S2 will be described. FIG. 8 is a diagram illustrating the buffering process. After the DCP prefetch process ends, in order to absorb the variation in network data transfer rate, the SMS server 11 acquires in advance a given amount of data from video data and audio data, respectively, and the MB 12 stores the acquired data in the local storage 12a for buffering.

When a DCP is registered and the exhibition starts, the MB 12 reads the DCP from the local storage 12a at a given rate. In the following case, it is assumed that a buffering process of acquiring in advance a given amount of data from video and audio data is not performed.

The MB 12 simultaneously performs the writing and the reading of video and audio data onto and from the local storage 12a. However, when a data transfer rate of the network 5 (a write rate) is lower than a read rate in a state where the buffering process is not performed, video and audio data which should be read from the local storage 12a lacks and thus an error occurs. Such a phenomenon is referred to as buffer underrun (the buffer underrun and processes to deal with the buffer underrun will be described below with reference to FIGS. 13 to 15).

Therefore, after the DCP prefetch process is performed in step S1 and necessary information for registration is stored, the SMS server 11 acquires in advance a given amount of data from video data and audio data, respectively, until the exhibition actually starts and the MB 12 stores the data in the local storage 12a for buffering. The given amount of data described herein refers to a sufficient amount of data for absorbing the variation in network data transfer rate.

In the case of FIG. 8, the SMS server 11 extracts a given amount of data V1 from the video data 32 of the DCP 30 which is the transfer source. The MB 12 generates video data 32-2 containing the header portion H1, the footer portion F1, and the video data V1 and stores the video data 32-2 in the local storage 12a for buffering. In addition, there is dummy data, which has been inserted in step S1, in an empty payload portion into which the video data V1 of the video data 32-2 is not inserted.

On the other hand, the SMS server 11 extracts a given amount of data A1 from the audio data 33 of the DCP 30 which is the transfer source. The data A1 is actual audio data portion other than the header portion H2 and the footer portion F2.

The MB 12 generates the audio data 33 containing the header portion H2, the footer portion F2, and the data A1 and stores the audio data 33 in the local storage 12a for buffering. As described above, since the audio data 33 has a relatively small data size, all the audio data 33 is stored in the local storage 12a at this time.

In the stage of FIG. 8, a prefetch DCP 30-2 includes the packing list 31, the video data 32-2, the audio data 33, the subtitle 34, and the closed caption 35.

As described above, after the DCP prefetch process, the SMS server 11 acquires in advance a given amount of video data which absorbs the variation in network data transfer rate. By performing a series of buffering process of storing a given amount of video data in the local storage 12a by the MB 12, the buffer underrun can be suppressed.

Figure 9:
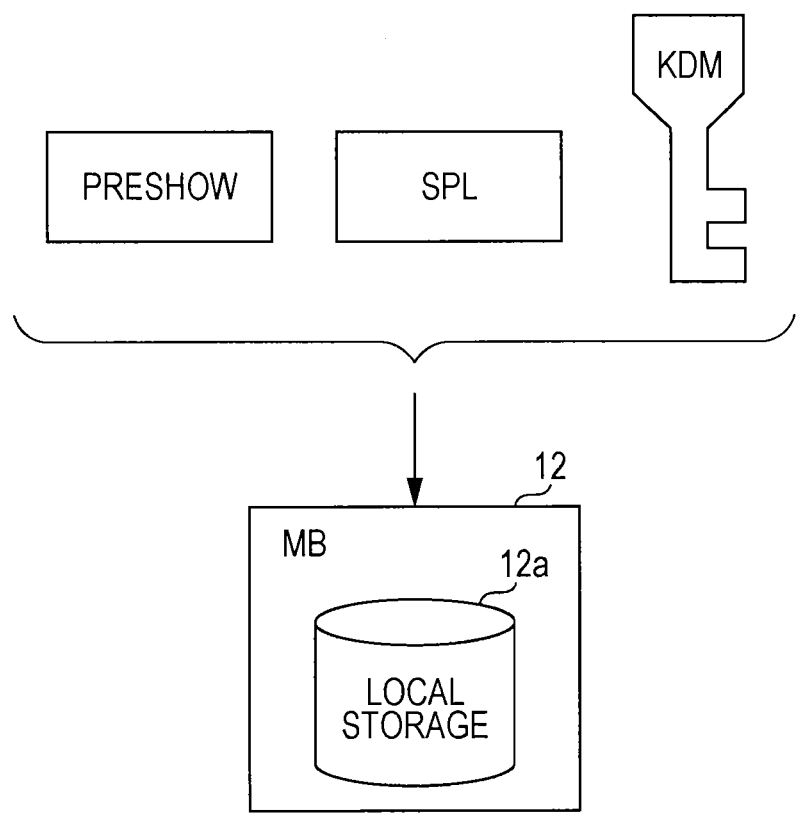
FIG. 9 is a diagram illustrating a process of acquiring a preshow, a show playlist, and a KDM.

Next, the acquisition of a preshow, a show playlist, and a Key Distribution Message (KDM) will be described. FIG. 9 is a diagram illustrating a process of acquiring a preshow, a show playlist, and a KDM.

In the stage of step S2, the MB 12 separately stores a preshow and a show playlist (SPL) pertaining to the DCP 30 in the local storage 12a.

The preshow is accessory information, such as an announcement of a movie and an advertisement of a theater or a product, which is projected before the exhibition of actual movie content. In addition, the show playlist is a list which specifies the order of reproducing accessory information such as an announcement of a movie and an advertisement of a theater (a list which shows the order of reproduction).

On the other hand, the MB 12 can acquire the KDM in the stage of step S2. The KDM refers to a decoding key data for reproducing movie content.

In general, DCPs are strictly encrypted, and even for the same movie content, encryption keys are different depending on projectors used for the exhibition. The MB 12 acquires a decoding key corresponding to a projector, which is a target of the reproduction device 10, through the TMS server 11 (or acquires a decoding key via an e-mail or the like from a movie distributor).

Figure 10:
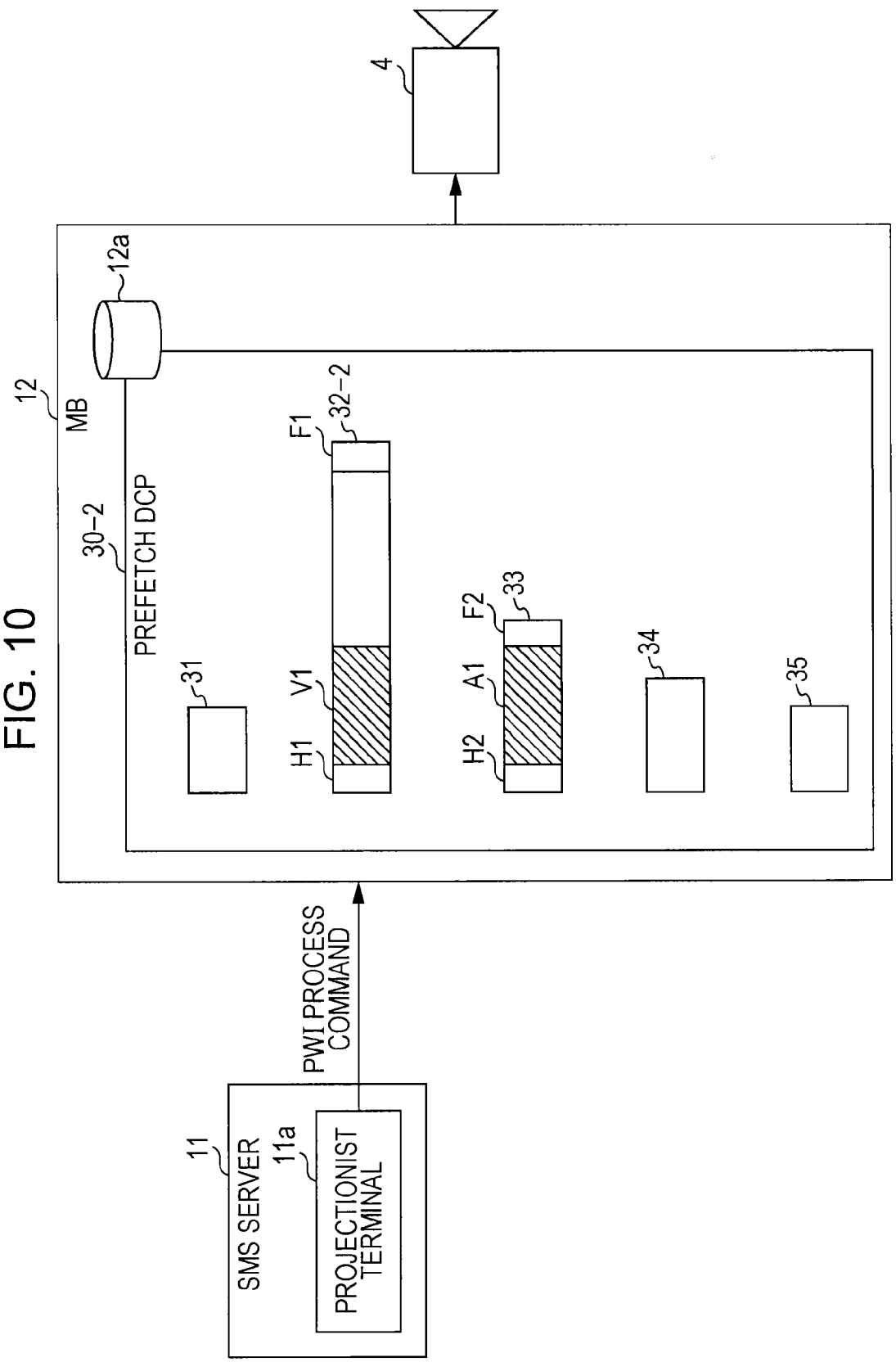
FIG. 10 is a diagram illustrating command transmission when a play-while-ingest (PWI) process is performed.

Next, a command transmission process for performing the PWI process of step S3 will be described. FIG. 10 is a diagram illustrating command transmission when the PWI process is performed. In the related art, until all the information of a DCP is stored in the storage 12a, it is difficult for the exhibition to start.

On the other hand, in the PWI process according to the present disclosure, once the buffering process of the video and audio data is performed in step S2, the storing (transmitting) of the video data in the local storage 12a and the reading of the DCP from the local storage 12a for reproduction are simultaneously performed.

When the PWI process starts, the operator gives a PWI process command to the MB 12 using a projectionist terminal 11a provided in the SMS server 11. By the operator operating the projectionist terminal 11a, the projectionist terminal 11a transmits a PWI process command to the MB 12.

Figure 11:
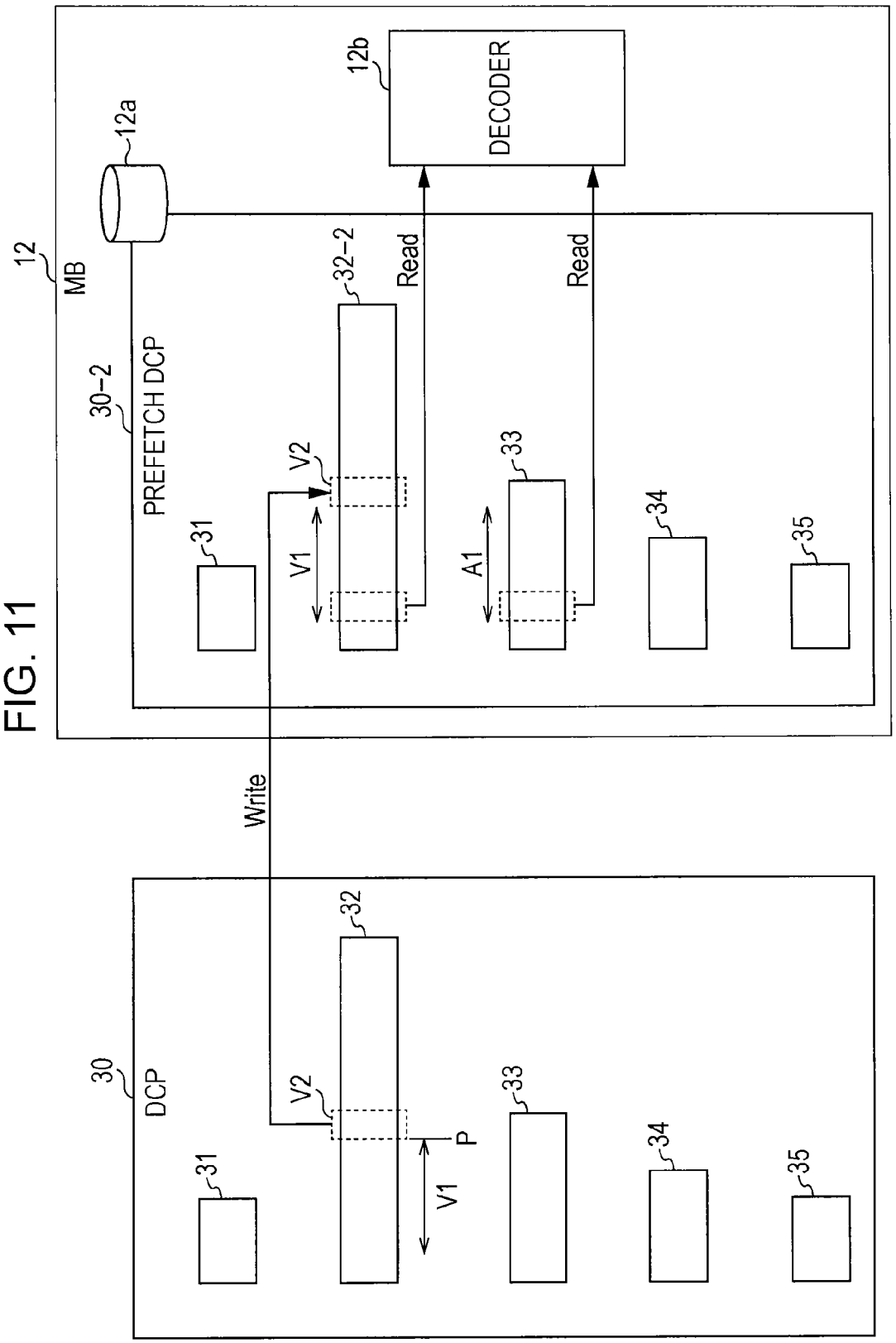
FIG. 11 is a diagram illustrating the PWI process.

Next, the PWI process of step S4 will be described. FIG. 11 is a diagram illustrating the PWI process. When the PWI process command, transmitted from the projectionist terminal 11a, is received, the MB 12 reproduces the prefetch DCP 30-2 and starts the exhibition according to the order specified by the SPL. Specifically, the video data V1 and the audio data A1 in the video data 32-2 are reproduced.

In addition, the MB 12 simultaneously starts the reproducing of the prefetch DCP 30-2 and the storing of remaining video data, which has yet to be acquired, in the local storage 12a through the SMS server 11.

That is, in the case of FIG. 11, a decoder 12b, which is positioned in the exhibition system inside the MB 12, reproduces the video data V1 and the audio data A1, which have been stored for buffering in step S2, while reading them from the local storage 12a.

In addition, in parallel with this PWI process, the transmission system of the MB 12 stores (transmits) the remaining video data V2 following a final position P, until which video data has been stored for buffering in step S2, in (to) the local storage 12a.

A rate of the decoder 12b reading data from the local storage 12a is almost the same as a rate of data written onto the local storage 12a. Since the decoder 12b recognizes that the DCP 30 is ingested in the local storage 12a, a function of the exhibition system of the MB 12 (function of the decoder 12b) performs the read process without any change.

Therefore, by performing the above-described PWI process, the DCP 30 can be exhibited as usual. Furthermore, by continuing the PWI process, eventually, the DCP 30 which is the transmission source is stored in the local storage 12a.

Figure 12:
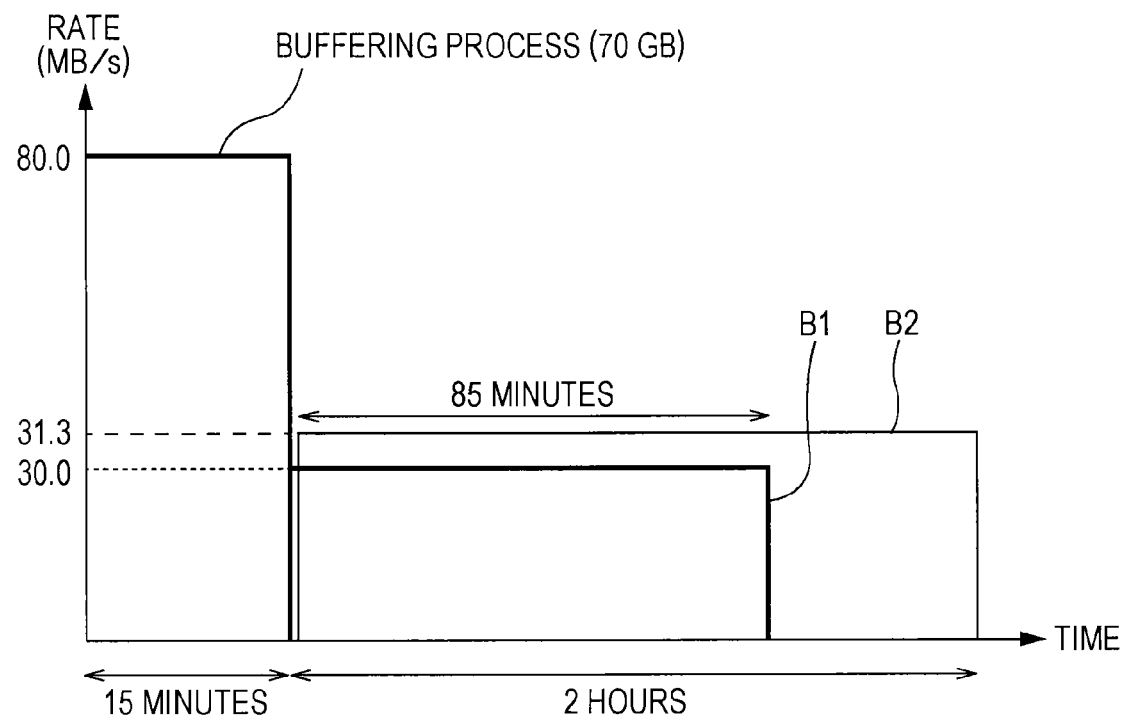
FIG. 12 is a diagram illustrating a specific example of the PWI process.

Next, a specific example of the PWI process will be described. FIG. 12 is a diagram illustrating the specific example of the PWI process. The vertical axis represents the rate (MB/s) and the horizontal axis represents the time. In this example, it is assumed that a DCP is a 2 hour-length (220 GB) movie content.

First, when the buffering process is performed, only the writing process is performed on the local storage 12a without performing the reading process. Therefore, the DCP can be written onto the local storage 12a at the maximum transfer rate.

In this case, assuming that the maximum write rate onto the local storage 12a, that is, the maximum transfer rate is 80 MB/s, 70 GB data can be stored in the local storage 12a after 15 minutes from the start of the buffering process.

Then, the PWI process is performed. After 15 minutes of the buffering process, in a simultaneous transfer process B1 of the PWI process, the remaining 150 GB data can be written onto the local storage 32a at a rate of 30.0 MB/s.

In addition, in a reproduction process B2 of the PWI process, data can be read from the local storage 12a at a rate of 31.3 MB/s which is slightly higher than that of the above-described writing process.

By simultaneously performing the writing process and the reading process with such a rate relationship, all the data of the 2 hour-length (220 GB) DCP can be stored in the local storage 12a within 85 minutes after the buffering process.

In addition, the 2 hour-length (220 GB) DCP can be exhibited as usual without buffer underrun. The numerical values used in the description of the PWI process are merely examples and can be flexibly changed at will in accordance with the customer's request.

Figure 13:
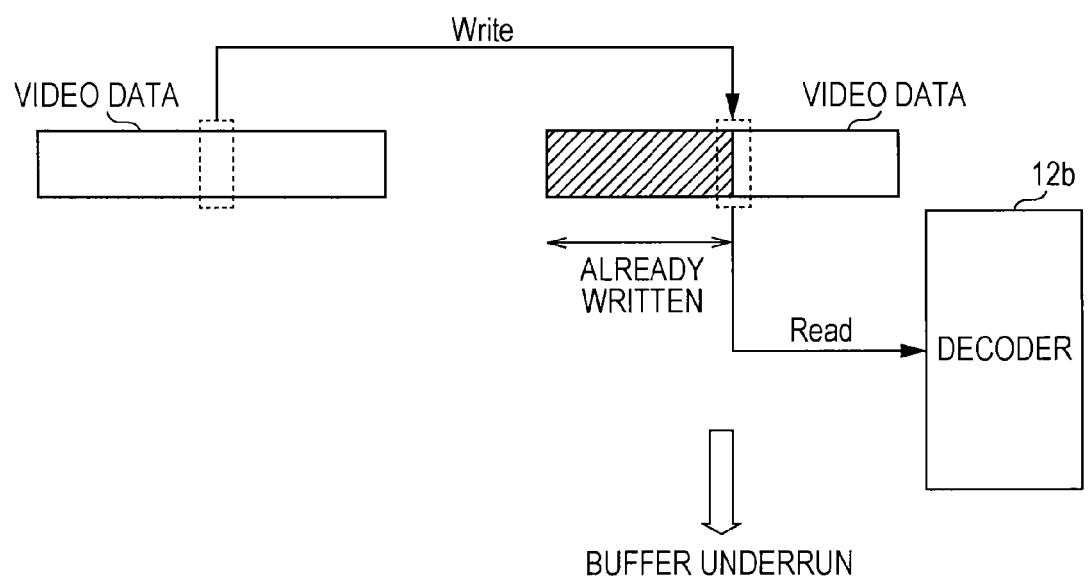
FIG. 13 is a diagram illustrating a buffer underrun state.

Next, a reproduction stop process of a case where the buffer underrun occurs in step S6 will be described. FIG. 13 is a diagram illustrating a buffer underrun state. When a rate of the decoder 12b reading video data from the local storage 12a is higher than a rate of writing video data onto the local storage 12a, buffer data is insufficient in the local storage 12a and the buffer underrun occurs as illustrated in the drawing.

Figure 14:
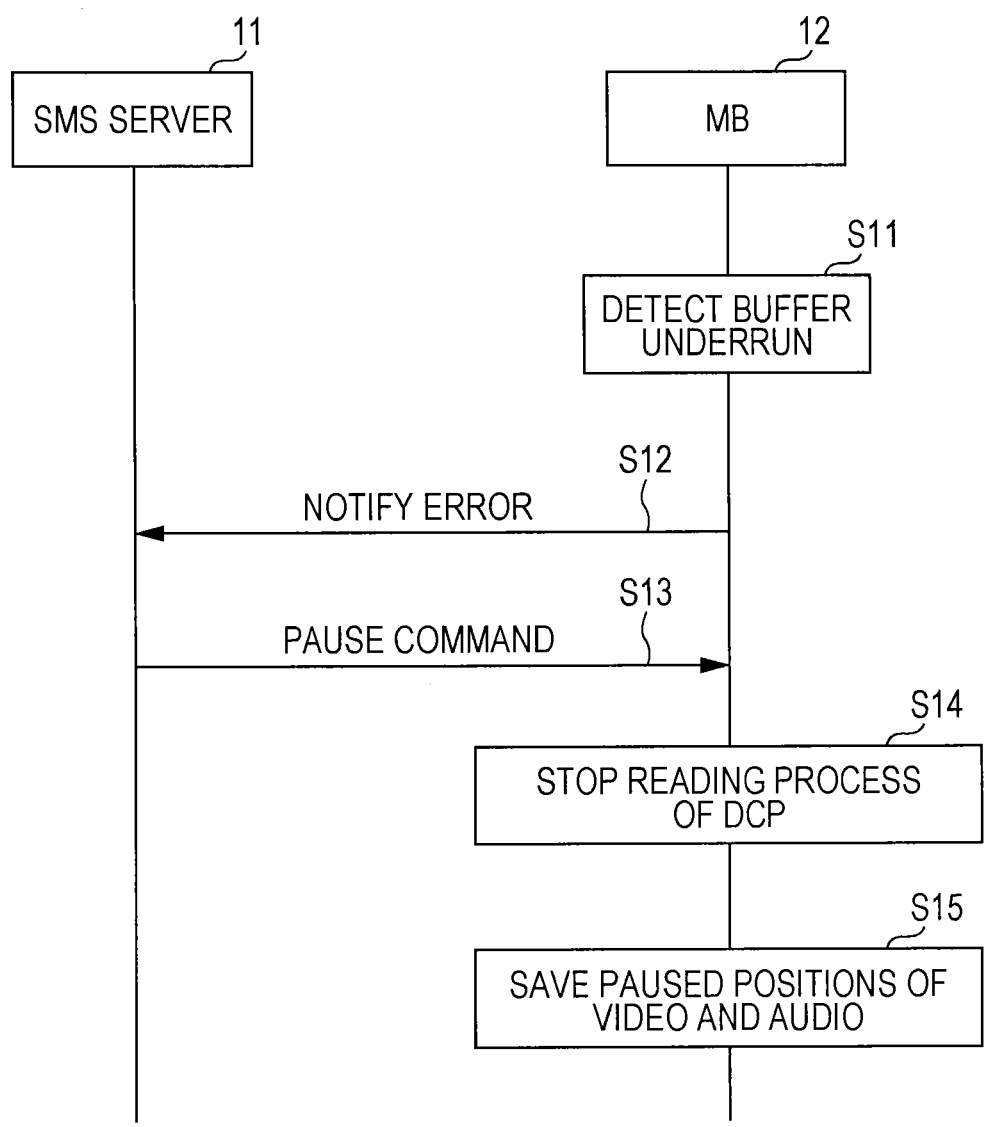
FIG. 14 is a sequence diagram illustrating the operation of a reproduction stop process in the buffer underrun state.

FIG. 14 is a sequence diagram illustrating the operation of the reproduction stop process in the buffer underrun state.

[S11] The MB 12 detects a buffer underrun during the exhibition.

[S12] The MB 12 notifies the SMS server 11 of the buffer underrun as error notification.

[S13] When the error notification is received, the SMS server 11 transfers a pause command to the MB 12.

[S14] When the pause command is received, the MB 12 stops reading the DCP from the local storage 12a and pauses the exhibition of the DCP.

[S15] The MB 12 saves paused positions of video and audio.

Figure 15:
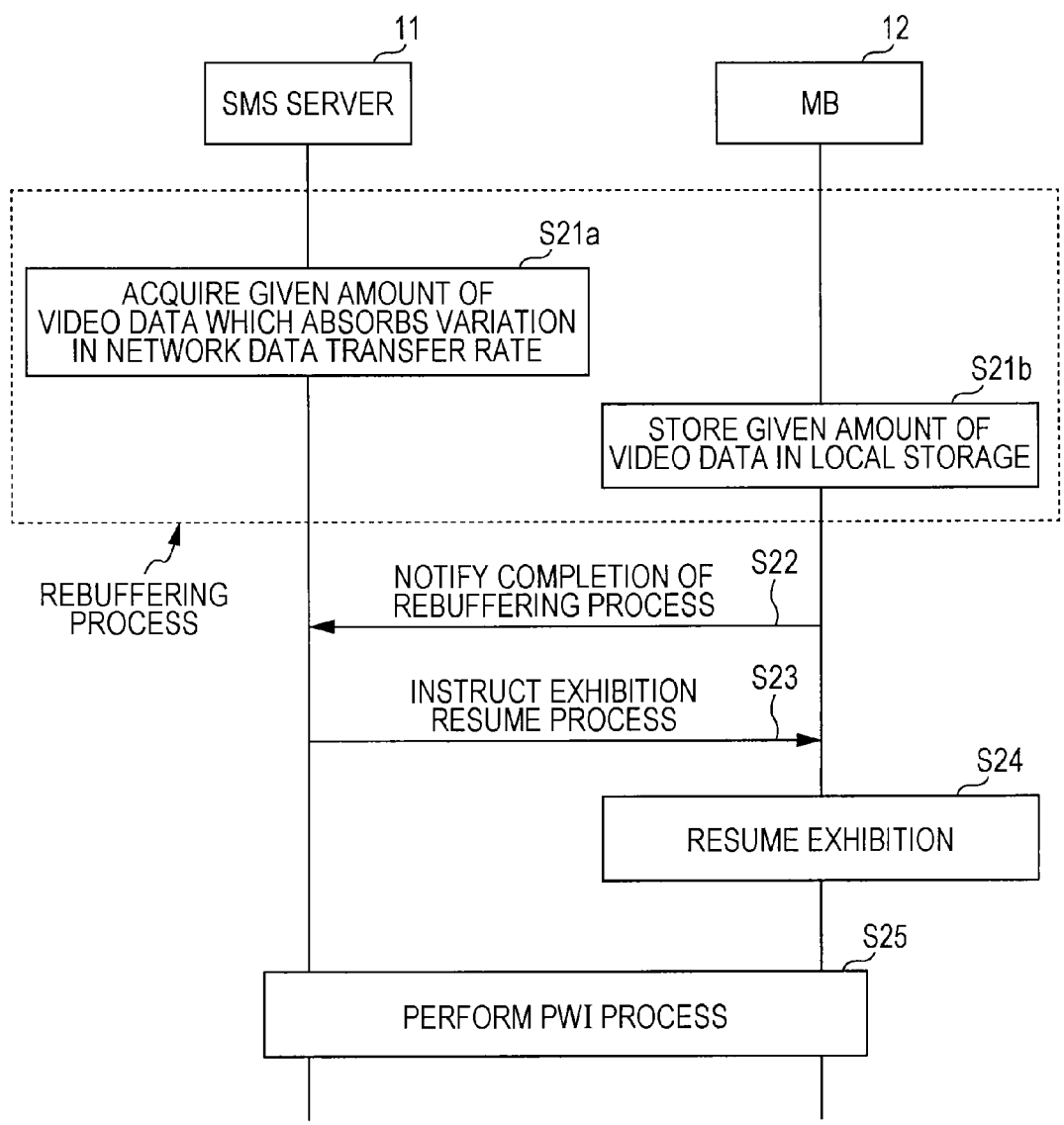
FIG. 15 is a sequence diagram illustrating the operations of a rebuffering process and an exhibition resume process.

Next, a rebuffering process and an exhibition resume process of step S7 will be described. FIG. 15 is a sequence diagram illustrating the operations of a rebuffering process and an exhibition resume process.

[S21a] When the buffer underrun occurs and the exhibition is paused, the SMS server 11 acquires again a given amount of video data which absorbs the variation in network data transfer rate. At this time, the amount of the reacquired data is not limited to being equal to a buffer amount at the time of the exhibition start and varies depending on the remaining exhibition time and the like.

[S21b] The MB 12 stores the acquired given amount of video data in the local storage 12a (in steps S21a and S21b, the rebuffering process is performed).

[S22] When it is recognized that the given amount of video data is stored in the local storage 12a, through the rebuffering process, the MB 12 notifies the SMS server 11 of the completion of the rebuffering process.

[S23] When receiving the notification of the completion of the rebuffering process, the SMS server 11 instructs the MB 12 to resume the exhibition.

[S24] When the exhibition resume instruction is received, the MB 12 resumes the exhibition at slightly rewound positions from the paused positions of video and audio which have been saved in step S15 of FIG. 14.

[S25] The SMS server 11 and the MB 21 performs the PWI process again.

When the PWI process ends, the exhibition of the DCP 30 ends appropriately. In addition, at this time, the prefetch DCP stored in the local storage 12a is changed to the normal DCP. That is, all the data of the DCP 30 which is the transfer source is stored in the local storage 12a.

As described above, in the image processing apparatus 1 and the image processing method according to the present disclosure, when the MB 12 reproduces a DCP and the completion of ingestion of the DCP is set as a requirement, the SMS server 11 performs a prefetch process of initially acquiring only a predetermined part of the data, which is included in the DCP when the DCP is distributed, and registering the DCP in the MB 12.

As a result, although actual video and audio data is not stored, the MB 12 determines in a pseudo manner that the requirement is satisfied and the ingestion is completed, and recognizes that the DCP is reproducible.

By performing such a control, without applying any change to the exhibition system of the MB 12, a DCP can be exhibited even in a state where the ingestion of the DCP is not completed. Therefore, a time from the acquisition of the DCP to the start of reproduction can be reduced to a large degree.

The present disclosure can adopt the following configurations.

(1) An image processing apparatus including:
an image acquisition unit that acquires image content distributed through the network; and an image reproduction unit that stores the acquired image content in a storage and reads the image content from the storage for reproduction, wherein when the image reproduction unit reproduces the image content and the completion of ingestion of the image content is set as a requirement, the image acquisition unit performs a prefetch process of acquiring a predetermined part of the data, which is included in the image content when the image content is distributed, and registering the data in the image reproduction unit, so as to cause the image reproduction unit to determine in a pseudo manner that the requirement is satisfied and recognize that the image content is reproducible.

(2) The image processing apparatus according to (1) above, wherein after the predetermined data is registered, the image acquisition unit acquires data other than the predetermined data from the image content, and the image reproduction unit simultaneously performs the writing of the data onto the storage and the reading of the stored data from the storage, so as to reproduce the image content.

(3) The image processing apparatus according to (1) or (2) above, wherein the image acquisition unit acquires at least one of list information, a header portion and a footer portion of video data, and a header portion and a footer portion of audio data, which are included in the image content, as the predetermined data.

(4) The image processing apparatus according to any one of (1) to (3) above, wherein the image acquisition unit further acquires at least one of subtitle information and closed caption information, which are included in the image content, as the predetermined data.

(5) The image processing apparatus according to any one of (1) to (4) above, wherein the image acquisition unit pads dummy data between the header portion and the footer portion of the video data and between the header portion and the footer portion of the audio data, and the image reproduction unit stores the video data and the audio data, where the dummy data is padded, in the storage.

(6) The image processing apparatus according to any one of (1) to (5) above, wherein after the predetermined data is acquired, the image acquisition unit acquires a given amount of video data, which absorbs the variation in network data transfer rate, from video data included in the image content in advance, and the image reproduction unit starts the reproduction of the image content after the given amount of video data is stored in the storage.

(7) The image processing apparatus according to any one of (1) to (6) above, wherein when the reproduction of the image content is interrupted halfway, the image reproduction unit pauses the reproduction and restarts the reproduction of the image content after a given amount of video data, which is acquired by the image acquisition unit and absorbs the variation in network data transfer rate, is stored in the storage.

(8) An image processing method including: acquiring image content distributed through the network; storing the acquired image content in a storage and reading the image content from the storage for reproduction; and when the image content is reproduced and the completion of ingestion of the image content is set as a requirement, performing a prefetch process of acquiring a predetermined part of the data, which is included in the image content when the image content is distributed, and registering the data, such that it is determined in a pseudo manner that the requirement is satisfied and it is recognized that the image content is reproducible.

(9) The image processing method according to (8) above, further including: after the predetermined data is registered, acquiring data other than the predetermined data from the image content, and simultaneously performing the writing of the data onto the storage and the reading of the stored data from the storage, so as to reproduce the image content.

(10) The image processing method according to (8) or (9) above, further including: acquiring at least one of list information, a header portion and a footer portion of video data, and a header portion and a footer portion of audio data, which are included in the image content, as the predetermined data.

(11) The image processing method according to any one of (8) to (10), further including: further acquiring at least one of subtitle information and closed caption information, which are included in the image content, as the predetermined data.

(12) The image processing method according to any one of (8) to (11) above, further including: padding dummy data between the header portion and the footer portion of the video data and between the header portion and the footer portion of the audio data; and storing the video data and the audio data, where the dummy data is padded, in the storage.

(13) The image processing method according to any one of (8) to (12) above, further including: after the predetermined data is acquired, acquiring a given amount of video data, which absorbs the variation in network data transfer rate, from video data included in the image content in advance; and starting the reproduction of the image content after the given amount of video data is stored in the storage.

(14) The image processing method according to any one of (8) to (13) above, further including: when the reproduction of the image content is interrupted halfway, pausing the reproduction and restarting the reproduction of the image content after a given amount of video data, which absorbs the variation in network data transfer rate, is stored in the storage.

(15) A video system, comprising:
a video reproduction device to receive, from a server, a predetermined subset of video and audio data and to start reproduction of the video and audio data based on the predetermined subset of video and audio data,
wherein the predetermined subset of video and audio data is sufficient to cause the video reproduction device to determine that all of the video and audio data has been received.

(16) The video system according to (15) above, wherein the video reproduction device does not begin reproduction of the video and audio data until the video reproduction device determines that all of the video and audio data is received.

(17) The video system according to (15) or (16) above, wherein the video and audio data is part of a Digital Cinema Package (DCP) which includes a packing list file, the video data, the audio data, subtitle data and closed caption data.

(18) The video system according to any one of (15) to (17) above, wherein the video reproduction device includes:
a Screen Management System (SMS) server to receive the predetermined subset of video and audio data via a network, and
a media block to start the reproduction of the video and audio data based on the predetermined subset of video and audio data.

(19) The video system according to any one of (15) to (18) above, wherein the SMS server sends a play-while-ingest command to the media block, and
in response, the media block buffers a first predetermined amount of video and audio data in local storage and begins reproduction of the video and audio data stored in the local storage while video and audio data received via the network are stored in the local storage.

(20) The video system according to any one of (15) to (18) above, wherein the SMS server pre-fetches the subtitle and closed caption data.

(21) The video system according to (15) above, wherein the predetermined subset of video and audio data includes a video data header, a video data footer, an audio data header and an audio data footer, and the SMS server inserts dummy data between the video data header and the video data footer and inserts dummy data between the audio data header and the audio data footer.

(22) The video system according to (15) above, further comprising:
a theater management server to send the predetermined subset of video and audio data via the network.

(23) The video system according to (15) above, wherein the predetermined subset of video data and audio data includes header and footer data for the video data and header and footer data for the audio data.

(24) The video system according to any one of (15) to (23) above, wherein the predetermined subset further includes a packing list, subtitle data and closed caption data.

(25) The video system according to any one of (15) to (21) above, wherein the dummy data is a string of continuous zero values.

(26) The video system according to (25) above, wherein the video and audio data are arranged according to a media exchange format including a header partition pack and header metadata, a footer partition pack and an essence container, and the dummy data is inserted in place of the essence container.

(27) The video system according to any one of (15) to (19) above, wherein the media block interrupts reproduction of the video and audio data when no more video and audio data are stored in the local storage, re-buffers a second predetermined amount of video and audio data, and resumes reproduction of the video and audio data from local storage after the re-buffering.

(28) The video system according to any one of (15) to (27) above, wherein the media block resumes reproduction of the video and audio data at a position where reproduction of the video and audio playback was interrupted.

(29) The video system according to any one of (15) to (17) above, wherein the DCP corresponding to the video and audio data is encrypted with a key corresponding to a projector used to reproduce the video and audio data.

(30) The video system according to any one of (15) to (29) above, wherein the key is not included in the DCP.

(31) The video system according to any one of (15) to (27) above, wherein the first predetermined amount of video and audio data is different from the second predetermined amount of video and audio data.

(32) The video system according to any one of (15) to (27) above, wherein the medial block notifies the SMS serves when the second predetermined amount of video and audio data has been stored in the local storage by the re-buffering, and the SMS server responds with a resume exhibition instruction to resume reproduction of the video and audio data.

(33) A video reproduction method, comprising:
receiving, from a server, a predetermined subset of video and audio data at a video reproduction device; and
starting reproduction of the video and audio data based on the predetermined subset of video and audio data,
wherein the subset of video and audio data is sufficient to cause the video reproduction device to determine that all of the video and audio data has been received.

(34) A non-transitory computer-readable medium encoded with computer-readable instructions thereon, the computer-readable instructions when executed by a computer cause the computer to perform a video reproduction method comprising:
receiving a predetermined subset of video and audio data; and
starting reproduction of the video and audio data based on the predetermined subset of video and audio data,
wherein the subset of video and audio data is sufficient to cause a determination that all of the video and audio data has been received.

In the above-described embodiment, various modifications can be made within a range not departing from the concept of the embodiment.

Furthermore, in the above-described embodiment, a number of alternations and modifications can be made by those skilled in the art, and the above-described embodiment is not limited to the above-described exact configurations and application examples.

What is claimed is:

1. A video system, comprising:
a video reproduction device configured to:
receive a predetermined subset of video and audio data;
determine that all of the video and audio data has been received; and
start reproduction of the video and audio data based on the predetermined subset of video and audio data, wherein
the predetermined subset of video and audio data includes a video data header, a video data footer, an audio data header, and an audio data footer,
the predetermined subset of video and audio data includes dummy data disposed between the video data header and the video data footer and dummy data disposed between the audio data header and the audio data footer, and
receipt of a subset of video and audio data which includes the dummy data is sufficient to cause the video reproduction device to determine that all of the video and audio data has been received.

2. The video system according to claim 1, wherein the video reproduction device is configured to not begin reproduction of the video and audio data until the video reproduction device determines that all of the video and audio data is received.

3. The video system according to claim 2, wherein the video and audio data is part of a Digital Cinema Package (DCP) which includes a packing list file, the video data, the audio data, subtitle data, and closed caption data.

4. The video system according to claim 3, wherein the video reproduction device includes:
a Screen Management System (SMS) server configured to receive the predetermined subset of video and audio data via a network, and
a media block configured to start the reproduction of the video and audio data based on the predetermined subset of video and audio data.

5. The video system according to claim 4, wherein
the SMS server is configured to send a play-while-ingest command to the media block, and
the media block is configured to:
in response to the play-while-ingest command, buffer a first predetermined amount of video and audio data in a local storage, and
begin reproduction of the video and audio data stored in the local storage while video and audio data received via the network are stored in the local storage.

6. The video system according to claim 4, wherein the SMS server is configured to pre-fetch the subtitle and closed caption data.

7. The video system according to claim 1, wherein
a theater management server configured to send the predetermined subset of video and audio data to the video reproduction device via a network.

8. The video system according to claim 1, wherein the predetermined subset further includes a packing list, subtitle data, and closed caption data.

9. The video system according to claim 1, wherein the dummy data is a string of continuous zero values.

10. The video system according to claim 9, wherein
the video and audio data are arranged according to a media exchange format including a header partition pack, and header metadata, a footer partition pack and an essence container, and
the dummy data is inserted in place of the essence container.

11. The video system according to claim 5, wherein the media block is configured to:
interrupt reproduction of the video and audio data when no more video and audio data are stored in the local storage,
re-buffer a second predetermined amount of video and audio data, and
resume reproduction of the video and audio data from local storage after the re-buffering.

12. The video system according to claim 11, wherein the media block is configured to resume reproduction of the video and audio data at a position where reproduction of the video and audio playback was interrupted.

13. The video system according to claim 3, wherein the DCP is encrypted with a key corresponding to a projector used to reproduce the video and audio data.

14. The video system according to claim 13, wherein the key is not included in the DCP.

15. The video system according to claim 11, wherein the first predetermined amount of video and audio data is different from the second predetermined amount of video and audio data.

16. The video system according to claim 11, wherein
the medial block is configured to notify the SMS server when the second predetermined amount of video and audio data has been stored in the local storage by the re-buffering, and
the SMS server is configured to respond with a resume exhibition instruction to resume reproduction of the video and audio data.

17. A video reproduction method, comprising:
receiving a predetermined subset of video and audio data at a video reproduction device;
determining that all of the video and audio data has been received; and
starting reproduction of the video and audio data based on the predetermined subset of video and audio data, wherein
the predetermined subset of video and audio data includes a video data header, a video data footer, an audio data header, and an audio data footer,
the predetermined subset of video and audio data includes dummy data disposed between the video data header and the video data footer and dummy data disposed between the audio data header and the audio data footer, and
receipt of a subset of video and audio data which includes the dummy data is sufficient to cause a determination that all of the video and audio data has been received.

18. A non-transitory computer-readable medium encoded with computer-readable instructions thereon, the computer-readable instructions when executed by a computer cause the computer to perform a video reproduction method comprising:
receiving a predetermined subset of video and audio data;
determining that all of the video data and audio data has been received; and
starting reproduction of the video and audio data based on the predetermined subset of video and audio data, wherein
the predetermined subset of video and audio data includes a video data header, a video data footer, an audio data header, and an audio data footer,
the predetermined subset of video and audio data includes dummy data disposed between the video data header and the video data footer and dummy data disposed between the audio data header and the audio data footer, and
receipt of a subset of video and audio data which includes the dummy data is sufficient to cause a determination that all of the video and audio data has been received.

* * * * *